United States Patent [19]
Nelson et al.

[11] Patent Number: 5,251,193
[45] Date of Patent: Oct. 5, 1993

[54] SOLID STATE OPTICAL DISK READER

[76] Inventors: Jonathan B. Nelson, 512 W. Green, Apt. 8, Champaign, Ill. 61820; Neil R. Brown, 8600 Skokie Blvd., Skokie, Ill. 60077

[21] Appl. No.: 765,031

[22] Filed: Sep. 24, 1991

[51] Int. Cl.$^5$ .................... G11B 7/085; G11B 7/095
[52] U.S. Cl. ............................... 369/44.12; 385/130
[58] Field of Search ............ 369/32, 100, 112, 44.12, 369/44.14; 365/215, 234; 385/129, 130

[56] References Cited
U.S. PATENT DOCUMENTS

| | | | |
|---|---|---|---|
| 4,425,023 | 1/1984 | Matsumoto et al. | 369/44.12 |
| 4,460,988 | 7/1984 | Gordon | 365/234 |
| 4,478,483 | 10/1984 | Sprague | 369/112 |
| 4,720,824 | 1/1988 | Hayashi | 369/112 |
| 4,853,919 | 8/1989 | Miyawaki et al. | 369/112 |
| 4,862,440 | 8/1989 | Miyamoto et al. | 369/44.23 |
| 4,887,255 | 12/1989 | Handa et al. | 369/112 |
| 4,937,808 | 6/1990 | Shimada et al. | 385/130 |
| 4,991,160 | 2/1991 | Premji | 369/44.12 |
| 5,105,403 | 4/1992 | Kando et al. | 369/112 |
| 5,144,603 | 9/1992 | Mozume et al. | 369/44.12 |

OTHER PUBLICATIONS

Arimoto et al., Waveguide Optical Deflector for an Optical Disk Tracking Actuator Using a Surface Acoustic Wave Device, Applied Optics, vol. 29, No. 2 pp. 247-250 (Jan. 20, 1990).
Ura et al., An Integrated-Optic Disk Pickup Device, Journal of Lightwave Technology, Vo. LT-4, No. 7, pp. 913-917 (Jul. 1986).
Ishibashi, et al., High Speed Accessing Magneto-Optical Disk Drive, SPIE vol. 899 Optical Storage Technology and Applications, pp. 8-15 (1988).
Ojima et al., High-Speed Overwritable Optical Disk, SPIE vol. 899 Optical Storage Technology and Applications, pp. 154-159 (1988).
Sincerbox, Miniature Optics for Optical Recording, SPIE vol. 935 Gradient-Index Optics and Miniature Optics, pp. 63-76 (1988).
Katoh et al., High-Speed Servo Technology for Optical Disk Drive, SPIE vol. 899 Optical Storage Technology and Applications, pp. 24-30 (1988).
Ukita et al., Super Small Flying Optical Head For Phase Change Recording Media, Applied Optics vol. 28, No. 20, pp. 4360-4365 (Oct. 15, 1989).
Ireland and Ley, Electro-optic Deflector Designs, pp. 84-91 (date unknown).
(Author Unknown), Principles of Optical Disk Systems, pp. 3, 70-82 (date unknown).
Tsai et al., Ultrafast Guided-Light Beam Deflection/-Switching and Modulation Using Simulated Electro-optic Prism Structures in $LiNbO_3$ Wave guides, Applied Physics Letters, vol. 27, No. 4, pp. 248-250 (Aug. 15, 1975).
Revelli, High Resolution Electro-optic Surface Prism Waveguide Deflector: An Analysis, Applied optics, vol. 19, No. 3, pp. 389-397 (Feb. 1980).
(Author Unknown), Computer Storage Technology and Integrated Optics excerpts from encyclopedia, pp. 258-260 and pp. 282-283 (date unknown).

*Primary Examiner*—Donald E. McElheny, Jr.
*Attorney, Agent, or Firm*—Allegretti & Witcoff, Ltd.

[57] ABSTRACT

A device that uses a laser beam to access data stored on an optical disk is disclosed. The laser beam is confined in a thin film optical waveguide having electrodes mounted onto the surface of the waveguide. The electrodes are arranged to form a coarse adjustment section, which adjusts the beam's direction to coincide with the data track of the optical disk to be accessed, and an electro-optic focus, which focuses the beam onto the surface of the optical disk. The electrodes are selectively supplied with voltages from a control circuit. When the electrodes are energized, the index of refraction of the waveguide is altered, causing the beam direction and focus to be adjusted so as to coincide with and become focused onto the data track. After reflection off the data track, the beam impinges upon an array of photodetectors. The photodetectors provide a feedback signal to the control circuit which is used to continually adjust the beam direction and focus as the optical disk is read.

19 Claims, 7 Drawing Sheets

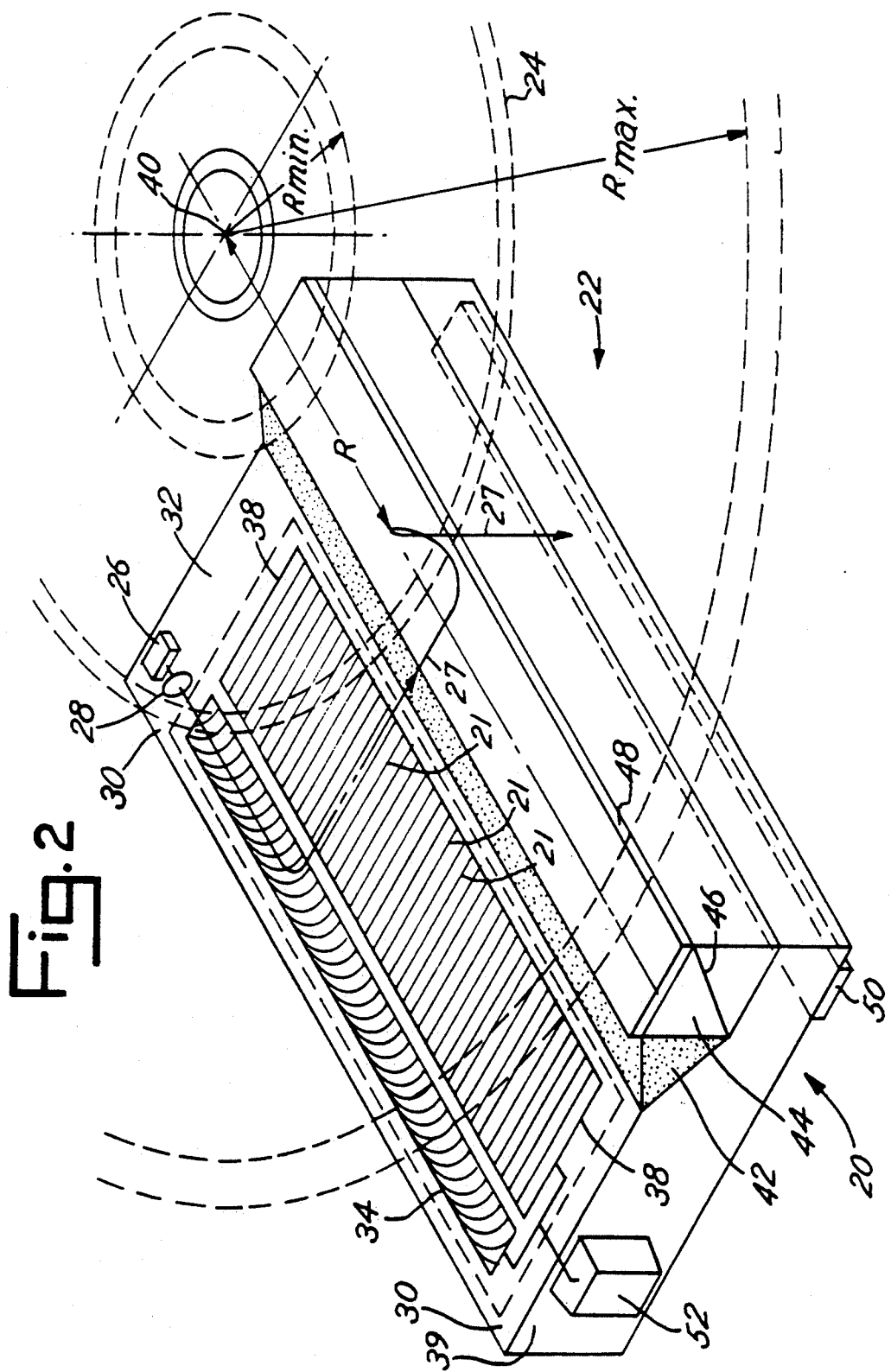

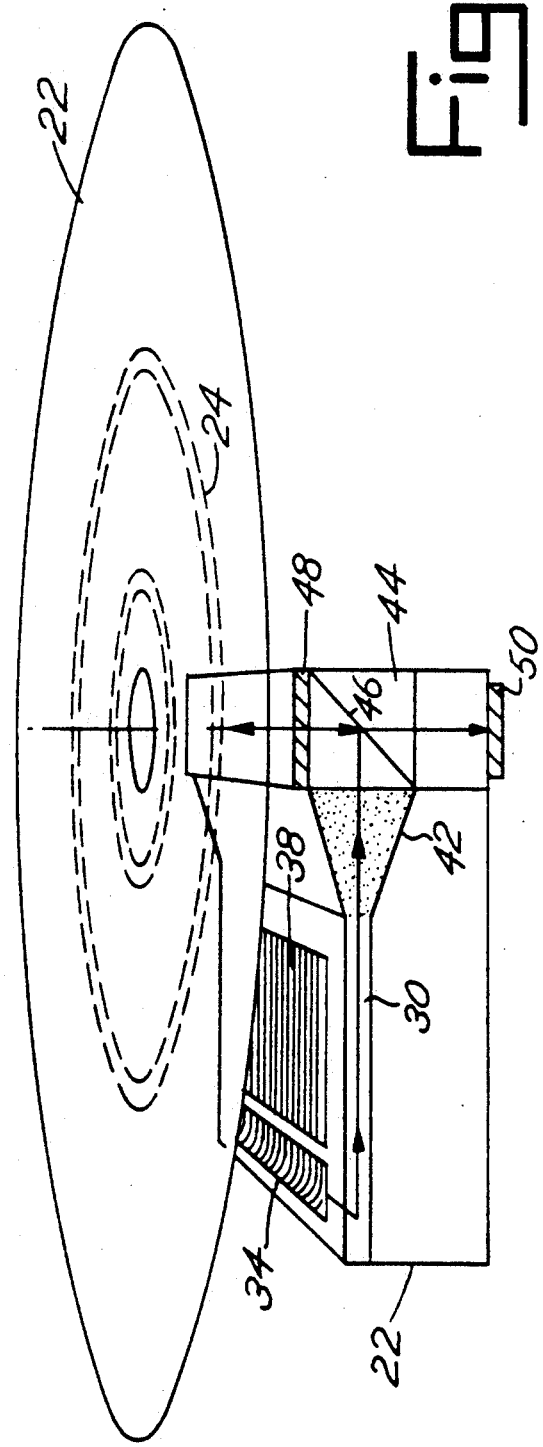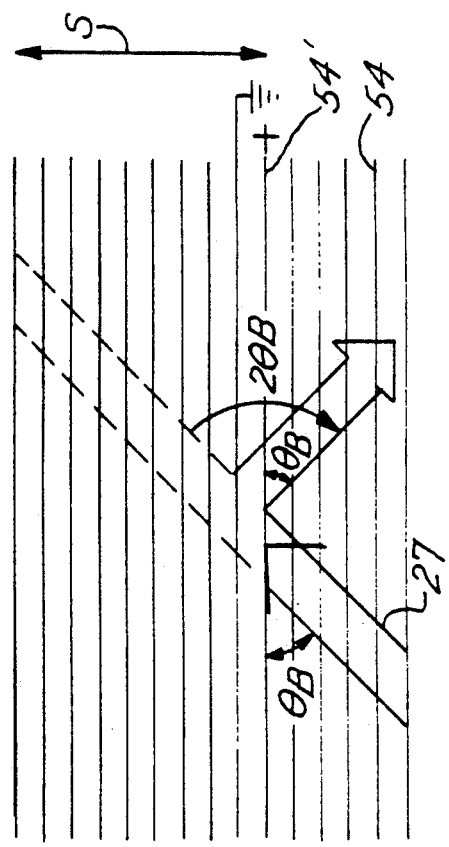

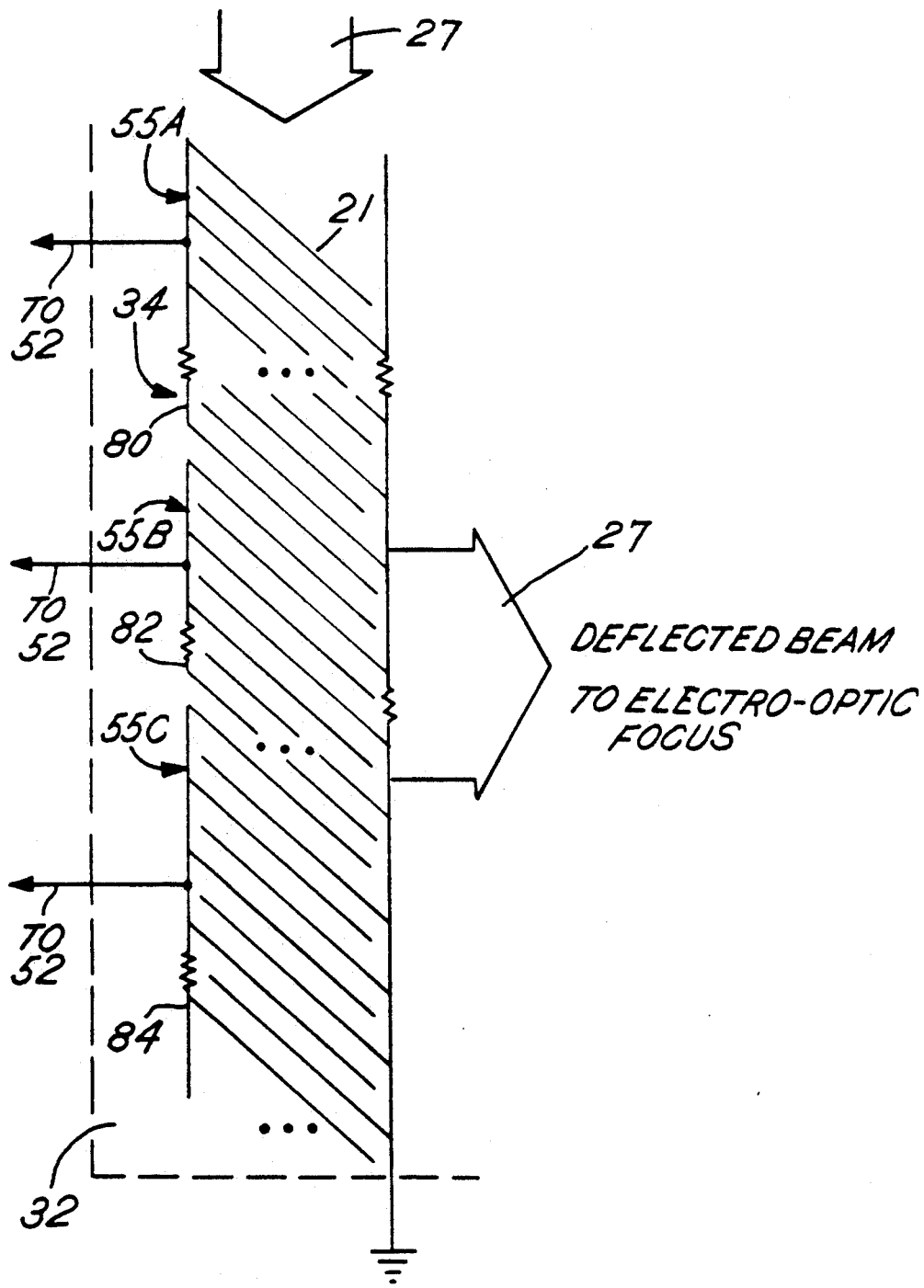

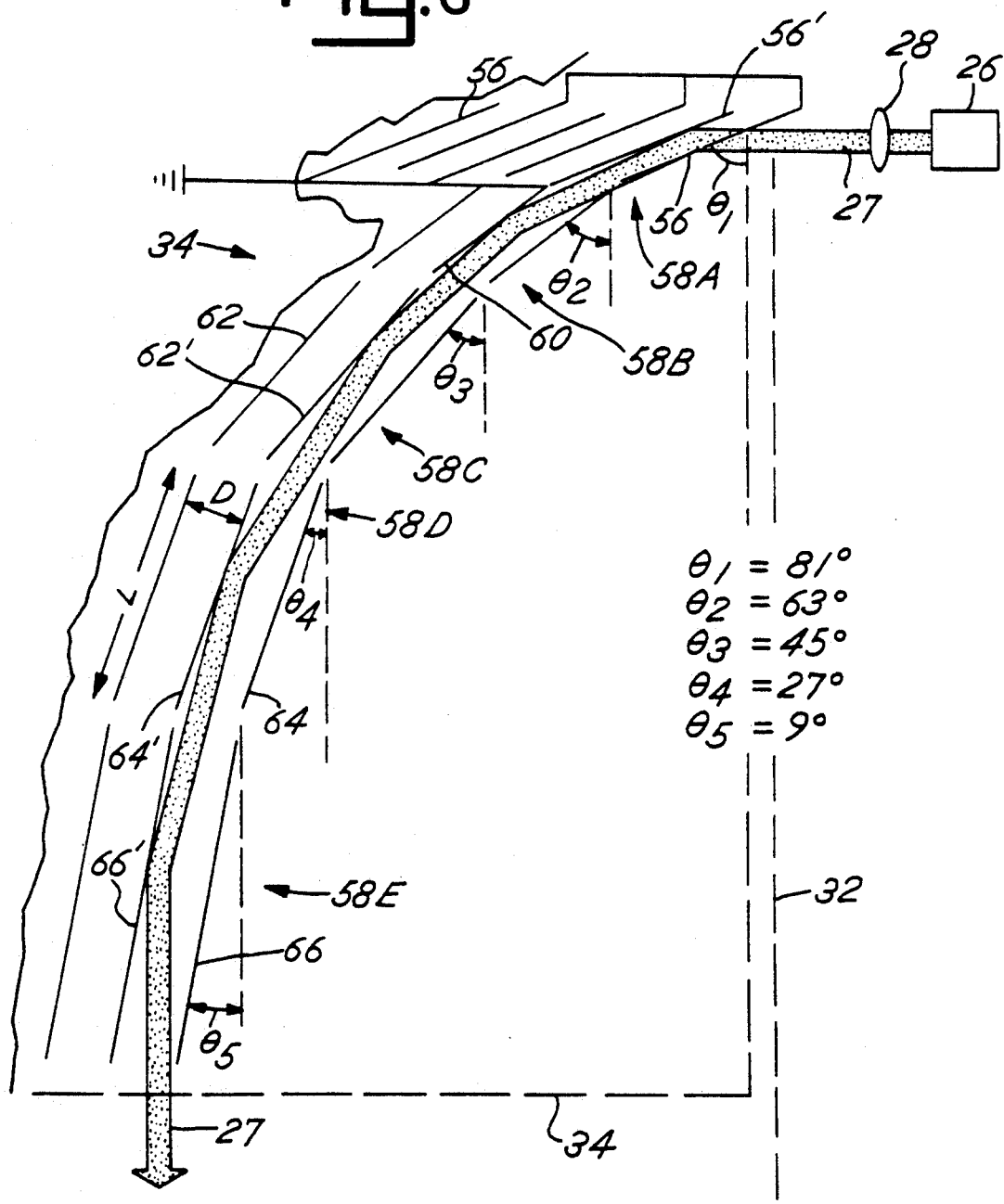

SOLID STATE OPTICAL DISK READER

BACKGROUND OF THE INVENTION

A. Field of the Invention

This invention relates generally to devices which are used to read and write data to storage media. More particularly this invention relates to a fully integrated solid state electro-optic device for reading and writing data to an optical storage disk.

B. Description of the Prior Art

An optical storage disk, or "optical disk", is a data storage device which has pits burned into the recording medium on its surface to represent bits of information. The pits are arranged in data tracks on the surface of the disk. To access the information, a low power laser beam is focused on the surface of the disk to detect the presence or absence of the pits. Optical disk technology is widely accepted as being the future replacement for magnetic disk storage technology, since optical disks provide the capability for storing much larger amounts of information in a given area as compared to magnetic disks. This fact is of significance to the computer industry, since a principle object of computer technology is to provide as much data storage space as practicable in any given system. Moreover, the optical disk technology is more rugged and relatively inexpensive.

Heretofore, however, the computer industry has not widely adopted optical disk technology for several reason. First, the data access time achieved by currently available optical disk drives is appreciably slower than that of magnetic disk drives. Secondly, the data transfer rate for optical disk drives has been inferior to that of magnetic disk drives. The fact that the optical disk drives in the prior art are slower reduces the efficiency of a prior art optical disk-based data processing system, thus reducing it attractiveness, notwithstanding the greater data storage capability. Clearly, if the data access and transfer time of an optical disk reading and writing device could match or exceed that of magnetic disk technology, a major breakthrough in data processing technology would be made.

The main reason for the inferior speed of the optical disk drives in the prior art is the slow response time exhibited by the focusing and tracking components of the optical disk drives. Most optical disk readers currently utilize a two-step focusing system. The first step is coarse focusing and adjustment where the laser beam is focussed at the approximate radial section of the optical media where the desired data exists. This is normally accomplished by moving the entire optical assembly along a mechanical actuator arm. The second step is fine focusing and radial adjustment to the exact location of the desired data. This is also typically accomplished mechanically, in most cases through the use of servos and magnets. The beam is focused using a mechanical lens.

Many researchers have tried to improve the access time and data transfer rate of optical disk drives by improving the efficiency and speed of either the coarse or fine focusing systems. However, most of the research efforts have concentrated on improving the mechanical systems, not replacing them. As a result, these methods have failed to remove the need for mechanical components such as servos and mechanical actuator arms, and have not appreciably increased the speed and efficiency of the technology.

One example of a prior art integrated optical reading and writing device is disclosed in G. Sincerbox, *Miniature Optics for Optical Recording*, Vol. 935 SPIE Gradient Index Optics and Miniature Optics, p. 63 (1988). This device must still be mechanically moved back and forth to keep the laser beam aligned with the data track on the disk and thus does not overcome the problems with slow data access time.

SUMMARY OF THE INVENTION

The present invention overcomes the aforementioned limitations of the prior art by providing a solid state optical disk reader for accessing data stored on an optical disk. The disk reader comprises a light source (typically a laser) emitting a beam in a beam direction. A thin film waveguide is optically coupled to the light source, thereby confining the beam to a defined 2 dimensional region. The waveguide has an electro-optic adjustment and focus means for electrically changing the index of refraction of the waveguide, thereby adjusting the direction of the beam as the beam passes through the waveguide. The beam direction is electrically adjusted to become radially aligned with and focused on the data track to be accessed. A reflecting means coupled to the waveguide reflects the beam from the waveguide to the data track, and a detector detects the beam after reflection of the beam from the data track. The detector issues a feedback signal to a control circuit which responsively issues control signals to the electro-optic adjustment and focus means.

In a preferred embodiment of the invention the electro-optic adjustment and focus means comprises an integrated coarse adjustment and an electro-optic focus. The integrated coarse adjustment consists of a plurality of parallel surface mounted electrodes oriented at an angle with respect to the beam direction. A particular set of the electrodes, depending on the radial distance of the data track on the optical disk to be accessed, is provided with an electrical potential which changes the index of refraction of the waveguide according to the electro-optic effect, so as to bend the beam to the approximate radial distance of the data track. The electro-optic focus emulates a convex lens by altering the index of refraction of the waveguide, and focuses the beam onto the surface of the data track. Since the invention accomplishes the focussing and adjusting of the beam electrically, and not mechanically, and without moving parts, it possesses the capability to dramatically reduce the access and data transfer times of the optical disk reader.

It is thus a principal object of the present invention to provide an optical disk reader that reduces the data access and transfer time, thereby increasing the speed and efficiency of the data processing system.

It is another object of the invention to provide an optical disk reader which eliminates the mechanical components found in the prior art, thereby eliminating the principal reasons for the slowness in prior art optical disk readers.

A further object of the invention is to provide an electro-optic coarse adjustment technique for aligning a laser beam onto a data track to be accessed without the use of mechanical or moving parts.

Still another object of the invention is to provide electro-optic focusing techniques whereby the laser beam is electrically focused onto the data track to be accessed without the use of a mechanical lens.

It will be appreciated by those of ordinary skill in the art that the objectives and features of the present invention can be realized not just in "data processing systems" or "computers" in the narrow sense, but may be realized in any technology employing optical disks as a medium for storing information, for example, compact disk technology.

Further advantages and features of the invention will be come apparent from the detailed description of the invention set forth below.

BRIEF DESCRIPTION OF THE DRAWINGS

FIG. 2 is a perspective view of the solid state optical disk reader of FIG. 1;

FIG. 3 is a oblique cross-sectional view of the solid state optical disk reader of FIGS. 1 and 2 showing the path of the beam as it passes through the disk reader and reflects off the disk onto the detector;

FIG. 4 is a illustration of the electro-optic effect showing the reflection of a beam from an electrode;

FIG. 5 is an illustration of the preferred design for the integrated coarse adjustment of FIG. 1 which uses the electro-optic effect shown in FIG. 4;

FIG. 6 is an illustration of an alternative form of the integrated course adjustment of FIG. 1;

DETAILED DESCRIPTION OF THE PREFERRED EMBODIMENT OF THE INVENTION

Figure 1:
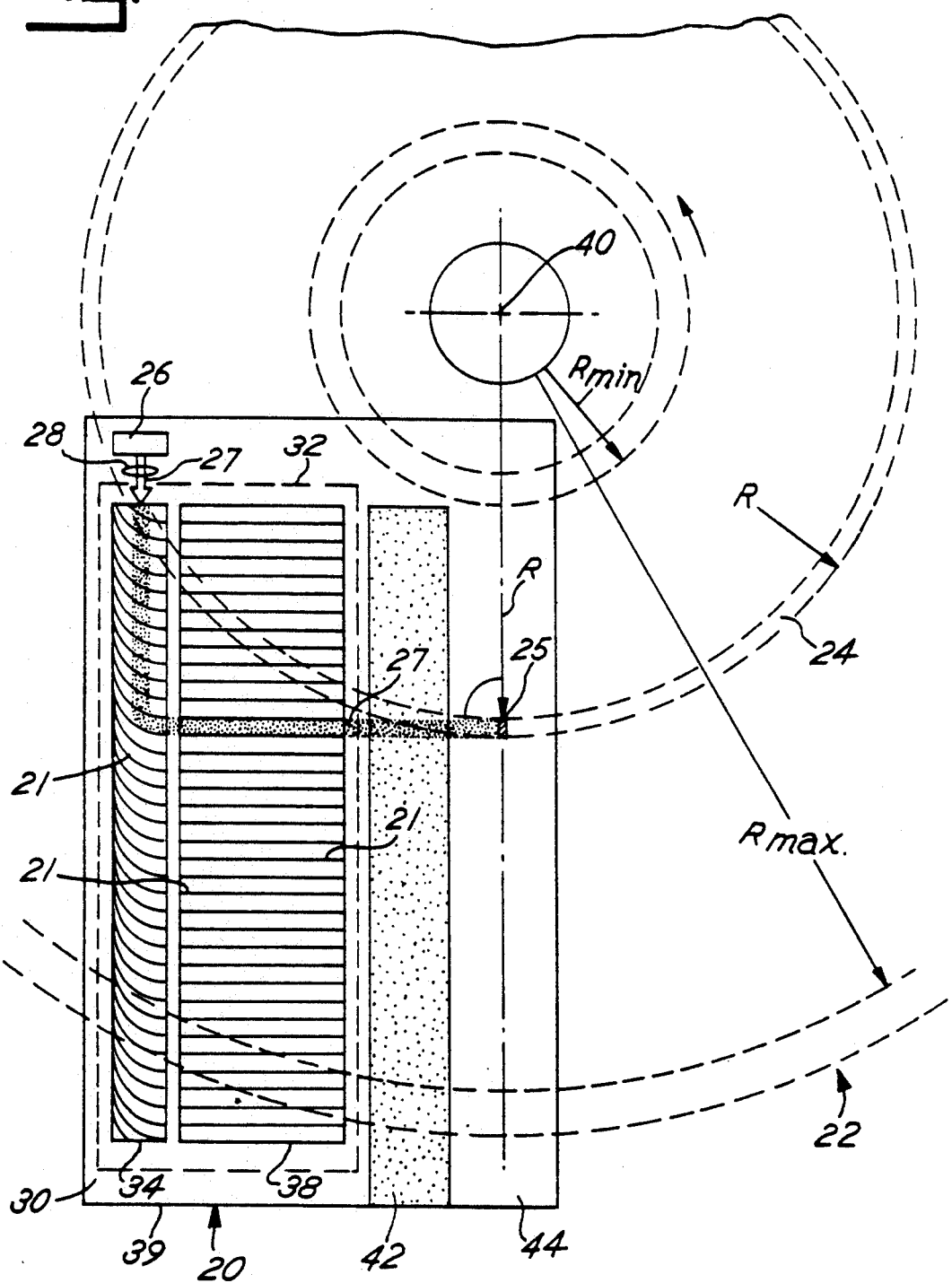
FIG. 1 is a overhead view of the solid state optical disk reader of the present invention with the optical disk shown in dashed lines.

FIG. 1 is an overhead view of a preferred embodiment of the solid state optical disk reader 20 of the present invention shown in conjunction with an optical disk 22. Optical disk 22 has a plurality of data tracks 24 which contain data to be accessed. The optical disk 22 is shown in dashed lines so as to show the optical disk reader 20, which lies directly below the optical disk 22.

The optical disk reader 20 has a laser light source 26 which emits a beam 27. The beam's direction of propagation is shown by the arrow. The beam 27 passes through a collimator 28 within a thin film optical waveguide 30. The light source 26 is optically coupled to the waveguide 30. The waveguide 30 has integrated, i.e. etched, onto its upper surface electrodes 21 which form an electro-optic adjustment and focus 32 shown in the dashed lines. The electro-optic adjustment and focus 32 comprises an integrated course adjustment 34 and an electro-optic focus 38.

The purpose of the integrated course adjustment 34 is to bend the beam 27 to the approximate radial distance R of the data track 24 from the center of the optical disk 40. The integrated coarse adjustment 34 uses the electro-optic effect to achieve this result by application of voltages to sets of surface mounted electrodes in the integrated course adjustment, which thereby changes the index of refraction of the waveguide 30. The beam 27 reflects off the electrodes through a total angle of 90° to become oriented at the approximate radial distance R of the data track 24. This process is discussed in more detail below in conjunction with the discussion of FIGS. 5 and 6, which show preferred and alternative embodiments for the integrated coarse adjustment 34 in greater detail.

The electro-optic focus 38 focuses the beam onto the surface of the data track 24. The operation and construction of the electro-optic focus 38 is described in detail below in conjunction with FIG. 8.

Referring again to FIG. 1, after the beam 27 has passed through the electro-optic focus 38, the beam 27 enters into a graded index region 42 of the waveguide 30. The graded index region 42 focuses the light wave and helps reduce scattering when the beam 27 exits the waveguide region. The graded index region 42 can be created by gradient diffusion of titanium (Ti) into a lithium niobate ($LiNbO_3$) substrate. Other methods of creating the graded index region are by sputtering the graded index layers, or of many other methods known by those skilled in the art.

As the beam 27 leaves the graded index region 42 of the waveguide 30, it enters a butt-coupled polarized prism cube 44. When the beam 27 hits the prism interface (not shown in FIG. 1) in the prism cube 44, it is reflected up toward the optical disk 22. On its way to and from the optical disk 22 the beam passes through a ¼ wave plate (not shown in FIG. 1) resulting in a 90° change in the polarization of the beam. Since the prism cube is polarized, the returning beam after reflection off the optical disk 22 passes straight through the prism interface in the prism cube 44 and strikes an array of photodetectors underneath the optical disk reader 20 (not shown in FIG. 1). The photodetector output signal is then used to read the data on the optical disk 22, correct focusing, and to correct the radial alignment or tracking. The optical disk reader is positioned underneath the optical disk 22 such that the light source 26 emits the beam parallel to the radial direction of the optical disk at the point where the data track is to be read. The beam makes a 90 degree turn as shown in FIG. 1 to become substantially tangential to and aligned upon the center of the data track 24 at the point 25 where the data track is read by the beam.

FIG. 2 is a perspective view of the optical disk reader 20. The light source 26 emits the beam 27 and the beam 27 passes through the collimator 28 within the waveguide 30. The integrated course adjustment 34 defects the beam 27 to the approximate radial distance R of the data track 24. The electro-optic focus 38 focuses the beam onto the data track 24. After the beam passes through the electro-optic focus 38 it passes through the graded index region 42 and enters a butt-coupled polarized prism cube 44. The polarized prism cube 44 has a prism plate 46 oriented at a 45° angle relative to the surface of the waveguide 30 (and thus to the beam 27). The prism plate 46 reflects the beam 27 up towards the disk 22. The beam 27 passes through a ¼ wave plate 48 which changes the polarization of the beam 27 by 90°. After the beam 27 reflects off the surface of the data track 24, the beam 27 is reflected back through the ¼ wave plate 48. The beam then passes through the polarized prism cube 44 and impinges on the detectors 50.

The detectors 50 provide a feedback signal to an operating chip or control circuit 52. The control circuit 52, in response to the feedback signals from the detectors 50, controls the voltages applied to the integrated course adjustment 34 and the electro-optic focus 38. Thus, by controlling the voltages applied to the electro-optic adjustment and focus 32 in response to feedback signals from the detectors, the beam 27 is continuously focused upon the disk 22 at the radial distance of the data track 24.

Referring to FIGS. 1 and 2, since the data tracks on the optical disk 22 are found at distances from $R_{min}$ to $R_{max}$ from the center of the disk 40, the optical disk reader 20 must possess the capability of accessing all the data tracks. The optical disk reader 20 of the present invention accomplishes this by the application of voltages to a particular set of electrodes 21 in the integrated coarse adjustment 34. In real time as the accessed data track 24 moves outward from $R_{min}$ toward $R_{max}$, the voltage is applied to adjacent sets of electrodes 21 in the integrated coarse adjustment 34 towards the outward end 39 of the optical disk reader 20.

Data track 24 is at distance $R_{min}$ when the disk 22 is first read, thus the first set of electrodes in the integrated coarse adjustment 34 are positioned on the waveguide 30 so as to bend the beam 27 to the approximate radial distance $R_{min}$ As the distance of the data track 24 moves toward $R_{max}$, during real time, the asymmetry of the beam around the center of the data track reaches a threshold limit, whereupon the first set of electrodes in the coarse adjustment 34 are de-energized and the adjacent set of electrodes in the integrated coarse adjustment 34 are supplied with a voltage. This process continues in real time as the radial distance of the data track to be accessed advances toward $R_{max}$.

FIG. 3 is an oblique cross sectional view of the optical disk reader of FIG. 1 showing the path of the beam 27 as it passes through the wave guide 30, the graded index region 42 and reflects off the prism plate 46. The beam passes through the ¼ wave plate 48 and reflects off the disk 22. After reflection, the beam passes through the ¼ wave plate 48 and the polarized prism cube 44 onto the detectors 50.

The manner by which the integrated coarse adjustment 34 bends the beam 27 to become approximately radially aligned with the data track is the electro-optic effect. FIG. 4 is an illustration of how the electro-optic effect is used to change the direction of a beam through a two-dimensional waveguide. The electro-optic effect is the change of the refractive index a material exhibits when an electric field is placed across the material. Because the effect is proportional to the electric field strength, the change is the most pronounced at the material's surface where the electrodes are mounted. This works well in the case of the optical disk reader of the present invention because it is desirable to the limit the light wave motion in two dimensions, thereby reducing losses due to scattering. In FIG. 4, a plurality of electrodes 54 are shown having length L separated by a distance D. A light beam 27 of wavelength λ encounters a surface mounted electrode 54' which has a voltage applied to it. The angle between the electrodes 54 and the incident beam 27 is represented by $\theta_B$. Part of the beam will be deflected by an angle of deflection $\theta_B$, which can be expressed as $\theta_B = \sin^{-1}(\lambda/2D)$, and the rest of the beam passes through as shown. The beam 27 will be completely deflected by adjacent pairs of energized and grounded electrodes if the total spacing or depth S is equal to:

$$\frac{\lambda N \cos\theta_B}{2 \Delta N} \quad (1)$$

where ΔN is the change in the refractive index caused by the electro-optic effect, and N is the refractive index of the medium. With a waveguide comprising Ti diffused in LiNbO₃, a preferred material for the present invention, N=2.286, and ΔN=0.001.

Referring now to FIG. 5, the deflection of the type illustrated in FIG. 4 is used in the integrated coarse adjustment 34 to bend the beam a total of 90° from the beam direction, as it is emitted from the light source 26 (FIG. 1), to approximately coincide with the radial distance of the data track. In FIG. 5, the electrodes 21 of the coarse adjustment 34 are oriented at a 45° angle relative to the beam 27 as it remitted from the laser source 26 (FIG. 1). The electrodes are grouped together in sets 55A-C of 40 pairs of electrodes per set. The electrodes are alternately grounded or connected to pads 80, 82 and 84 which are selectively supplied with voltages from the control circuit 52 (FIG. 2) to bend the beam towards the electro-optic focus.

The electrodes are etched onto the surface of the waveguide 30 with a separation distance of approximately 0.56 um. Integrated circuit etching is typically done by applying a photoresist mask, using a template created earlier with electron beam etching, to the material surface. The masked material is then exposed to a mercury lamp which etches the areas that are not protected with photoresist. Conventional photo mask printing, however, cannot work effectively with submicron patterns because of the resolution limited by defraction. However, positive use of the defraction effect can be made as far as periodic patterns are concerned; the technique developed for hologram copying can be applied effectively. Diffraction theory shows that the minimum grating period which can be copied with illuminating wavelength λ is given by Δ=λ/2. This implies that most grating patterns for for integrated optics can be duplicated by employing a conventional integrated circuit etching apparatus having a mercury lamp, the only modification being the incident light angle. The possibility of this technique has been confirmed in a preliminary experiment using a 0.4 um period. See Nishihara, *IEEE Journal of Quantum Electronics*, Vol. QE-22, No. 6, June, 1986. Since the optical disk reader of the present invention only requires a period of 0.56 um, the one-step course adjustment section of FIG. 5 is presently feasible.

An alternative course adjustment section 34 is shown in FIG. 6. In FIG. 6, the integrated coarse adjustment 34 is broken down into a number of smaller stages 58A-E. Since the total reflected beam angle for each stage is $\theta_B$, and the total deflection is equal to 90°, each stage deflects the beam by an equal fraction of 90°, i.e. 18°.

While the first stage 58A preferably consists of a plurality of parallel surface mounted electrodes 56 mounted onto the waveguide, the elements of the other stages 58B-E may be constructed as either electrodes, or as passive waveguide devices such as waveguide ridges. Since the beam 27 will travel in the direction of propagation in a straight line if the index of refraction is unchanging, the stages 58B-E will not be encountered by the beam 27 unless a voltage is applied to electrodes in the first stage 58A. It is possible to use surface mounted electrodes in each stage 58A-E, but the complexity of the device increases if electrodes are used for the stages 58B-E.

In FIG. 6, the parallel electrodes 56 of first stage 58A are oriented at an 9° angle relative to the beam direction, making $\theta_B=9°$. When the beam enters the integrated coarse adjustment, the beam 27 passes through the waveguide until it reaches the region under the surface mounted electrode 56', which is part of a set of electrodes, and which has applied thereto a voltage. The voltage on the electrode 56' changes the index of refraction of the waveguide, causing a portion of the beam 27 to reflect towards the second stage 58B. The parallel electrodes 60 (or passive waveguide device) in the second stage 58B are oriented at a 9° angle relative to the beam direction from the first stage 58A. The beam 27 reflects off electrode (or passive waveguide device) 60, through an angle of 9° toward the third stage 58C. Parallel electrodes (or passive waveguide devices) 62 in the third stage 58C are oriented at a 9° angle relative to the beam direction from the second stage 58B. The beam 27 reflects off electrode (or passive waveguide device) 62' through an angle of 9° toward the third stage 58D. Parallel electrodes (or passive waveguide devices) 64 in the fourth stage 58D are oriented at a 9° angle relative to the beam direction from the second stage 58C. The beam 27 reflects off electrode (or passive waveguide device) 64' through an angle of 9° toward the fifth stage 58E. Parallel electrodes (or passive waveguide devices) 66 are oriented at a 9° angle relative to the beam direction from the fourth state. The beam reflects off electrode (or passive waveguide device) 66' at the approximate radial distance of the data track 24 (not shown in FIG. 6). The beam 27 passes from the integrated coarse adjustment to the electro-optic focus, shown in detail in FIG. 7.

Different numbers of stages for the course adjustment 34 can be chosen, and each stage has its own diffraction angle and electrode distance that must be met in order to bend the beam the 90° necessary to approximately align the beam with the data track. Several possible numbers of stages are shown in the following table:

TABLE I

| Number of Stages | Deflection Angle $\Theta_s$ | Electrode Spacing ($\mu$m) |
|---|---|---|
| 1 | 45° | 0.565 |
| 2 | 22.5° | 1.045 |
| 3 | 15° | 1.545 |

TABLE I-continued

| Number of Stages | Deflection Angle $\Theta_s$ | Electrode Spacing ($\mu$m) |
|---|---|---|
| 4 | 11.25° | 2.050 |
| 5 | 9° | 2.557 |
| 10 | 4.5° | 5.098 |

In FIG. 6, the electrode spacing D between parallel electrodes in any of the stages 58A-E is approximately 2.56 um.

After the beam 27 has passed through the integrated coarse adjustment 34 (FIGS. 5 and 6), the beam passes through the electro-optic focus 38 where the beam is electrically focused onto the data track. One section of the electro-optic focus 38 of FIGS. 1 and 2 is shown schematically in FIG. 7. The electro-optic focus 38 comprises a plurality of surface mounted electrodes 100 oriented parallel to the direction of beam propagation and arranged in an array.

The array of parallel electrodes 100 extends the full length of the optical disk reader 20 (FIG. 1) to the outward end 39. Only one section of the array is shown in FIG. 7.

The purpose of the electrodes 100 is to alter the index of refraction of the waveguide so as to emulate a convex lens, thereby adjusting the focal length of the beam 27 and focusing the beam 27 onto the data track of the optical disk. If voltages of opposite polarity are placed across one pair of electrodes 102A and 102B and another pair of electrodes 104A and 104B, as shown symbolically in FIG. 8 by the "+" sign on electrodes 102A and 102B and the "−" sign on electrodes 104A and 104B, an electric field is created between the pairs of electrodes. The electric field in turn alters the index of refraction of the waveguide in the region of the beam, focussing the beam 27. The focal length of the beam 27 is dependant on the voltages applied to the electrodes 102A-B and 104A-B, as described below.

Figure 7:
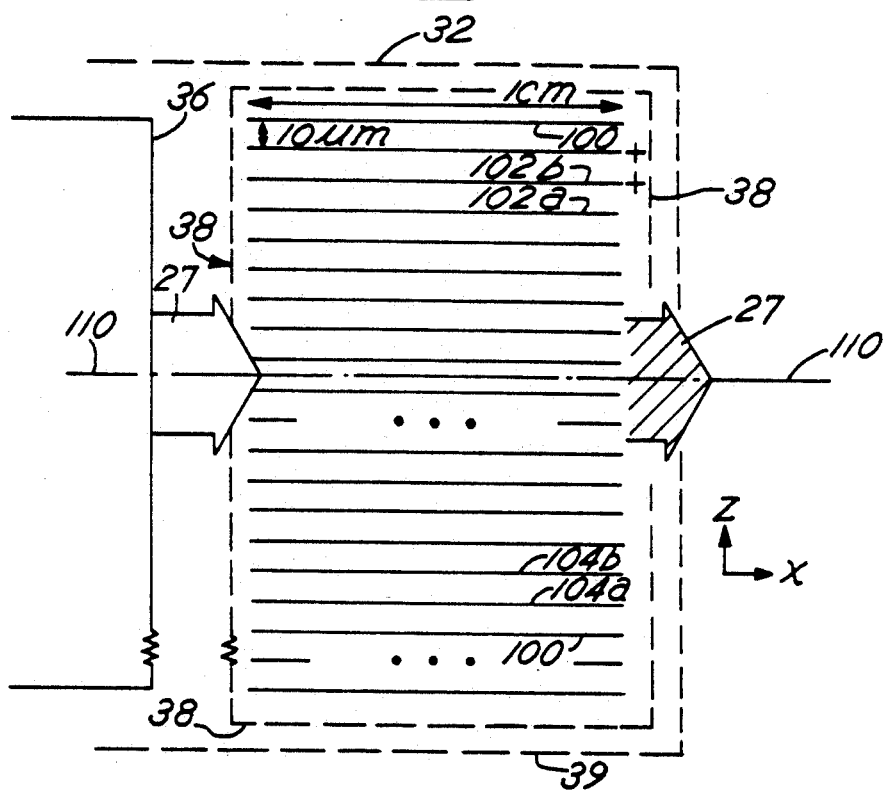
FIG. 7 is a schematic illustration of the electro-optic focus, of FIG. 1, showing pairs of electrodes which are energized to emulate a lens.
Figure 7A:
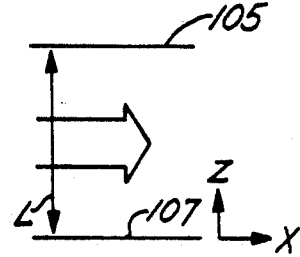
FIG. 7a is a schematic illustration of a pair of electrodes of FIG. 7 which emulate a lens when energized.

Referring to FIG. 7a, if one considers electrodes 105 and 107 separated a distance L as representing electrode pairs 102A and 104A of FIG. 7, let X represent a coordinate axis in the direction of the electrodes and let Z represent a coordinate axis perpendicular to the electrodes. If a voltage is applied across the electrodes, an electric field is created between the electrodes. The field strength in the Z direction is given by the expression $$E_Z(X,Z) = \frac{-V}{\pi} [Z(1-Z)]^{-\frac{1}{2}}$$

where V is the applied voltage and Z is the fractional distance from either electrode (i.e., Z=0 at electrode 106, Z=½ midway between the electrodes, Z=1 at electrode 104).

Figure 8:
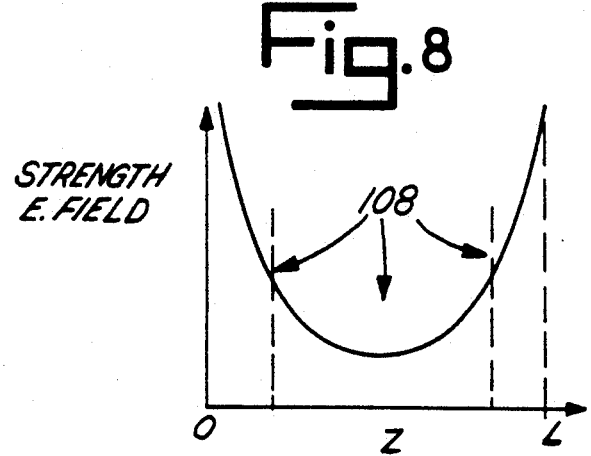
FIG. 8 is a graph of electric field strength as a function of distance in the electro-optic focus of FIG. 7.

If the intensity of the electric field is plotted as a fraction of Z as shown in FIG. 8, the center of the plot 108 approximates a parabolic curve. Since the phase shift (and therefore angle of deflection) of a beam passing between the electrodes varies directly with the electric field strength, the region 108 of the curve represents a parabolic alteration of the electric field in the waveguide, and thus the emulation of a lens.

For the Ti:LiNbO$_3$ waveguide described herein, the relationship between the phase shift $\eta$ of the beam and the electric field between the electrodes is:

$$V \approx \frac{\pi Z^2}{n_e^2 r_{33} f} [Z(1-Z)]^{\frac{1}{2}} \quad (4)$$

It can be shown that the equation for the focal length f is given by:

$$\eta(Z) = \frac{-\pi n e^3 r_{33}}{\lambda} \int_O^L E_Z(X,Z) dZ \quad (2)$$

Solving for voltage leads to the following equation describing the relationship between focal length and voltage:

$$f = \frac{Z}{\sin^{-1}\left(\frac{n_e^2 r_{33} V}{\pi ZL} \int_O^L [Z(1-Z)]^{-\frac{1}{2}} dz\right)} \quad (3)$$

Because the sum represented by the integral in equation (2) (the total electric field encountered by a beam passing through the field) varies with position of the beam as it enters and traverses the field, equation (3) is difficult to solve directly. However, the integral can be approximated by using numeral techniques. As an example, for an electrode spread or separation between activated electrodes of 2,500 microns (um), a beam width of 500 um, and an electrode length of 10,000 um, the following table of focal lengths was calculated:

TABLE I

| Voltage (Volts) | Focal Length (mm) | Average Weighted Beam Spread (μm) |
|---|---|---|
| 93 | 30.398 | 0.940 |
| 93.5 | 30.219 | 0.952 |
| 94. | 30.028 | 0.943 |
| 94.5 | 29.843 | 0.943 |
| 95 | 29.664 | 0.944 |

As Table I demonstrates, a small change in the voltage applied to the electrode produces a definite change in the focal length without unduly altering the spread of the beam. The beam spread can be reduced by increasing the electrode spread; however, larger electrode spreads require higher voltages to achieve the same focal length.

Figure 9:
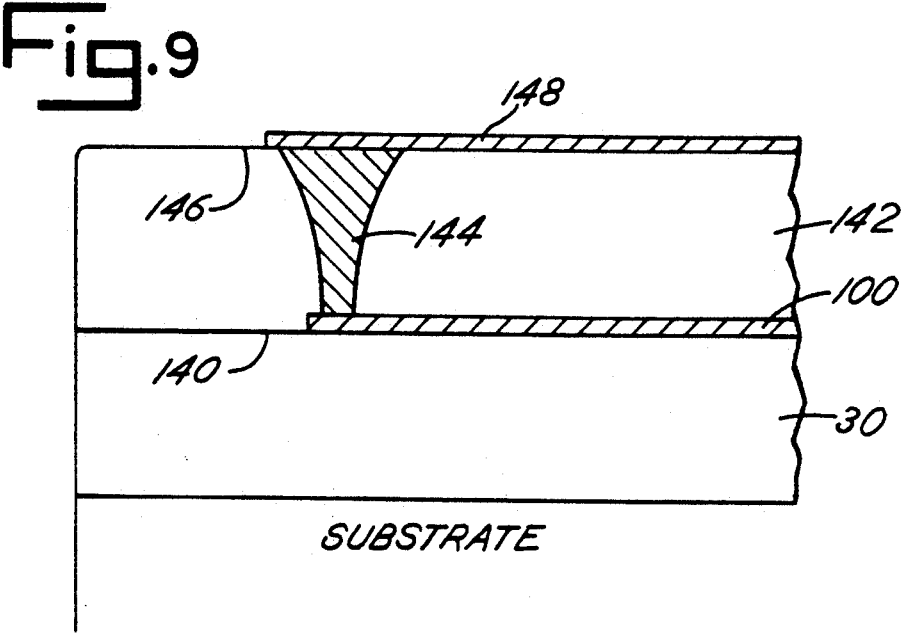
FIG. 9 is a cross-sectional view of the optical disk reader of FIG. 1 in the region of the electro-optic focus greatly enlarged, showing the connecting electrodes which supply voltages to the surface mounted electrodes of the electro-optic focus of FIG. 8.

One method of supplying voltages to the surface mounted electrodes 100 of the electro-optic focus is shown in FIG. 9, which is a cross-sectional view of the electro-optic focus region along the length of an electrode, shown greatly enlarged. The waveguide 30 has a surface mounted electrode 100 etched into the upper surface 140 of the waveguide. Above the waveguide is a layer of non-conducting material 142. A well 144 is burned into the non-conducting layer down to the upper surface 140 of the waveguide 30 and the electrode 100. The well 144 is filled with a conducting material. A supply electrode 148 is etched into the upper surface 146 of the non-conducting material 142 and brought into contact with the well 144. The supply electrode 148 is connected to a connection pad for the electrodes in the electro-optic focus, which in turn has leads running to the power and logic circuits in the control circuit 52 (FIG. 2).

Referring again to FIG. 7, the pairs of electrodes that are activated 102A and 102B and 104A and 104B are chosen such that the beam's center 110 is midway between the pairs of electrodes 102A and 102B and 104A and 104B. If the electrodes are etched with a separation distance of 10 um between adjacent electrodes, the center of the beam 110 can be offset from the center of an electrode pair by as much as 5 um. If the beam 27 is off-center, the beam 27 is skewed by the lens when the beam undergoes focussing. To compensate for the possibility that the beam 27 may be off center, two electrode pairs of opposite polarity, 102A and 104A, and 102B and 104B, are supplied with voltages and the relative voltages on each pair is adjusted. The voltage supplied to each pair, 102A and 104A, and 102B and 104B, will be a fraction of the total voltage to be applied, and the fraction is directly related to the distance of the beam's center 110 to the midpoint between the pairs. For example, assume that the center of the beam is 5 um to the left of the center of the pair of electrodes 102A and 104A, and 5 um to the right of the center of pair 102B and 104B. If we call the pair 102A and 104A pair 1, and the distance from the beam center to the midpoint of pair 1 $D_1$ and pair 102B and 104B pair 2, and the distance from the beam center to the midpoint of pair 2 $D_2$, then Voltage(pair 1) =

$$1 - \frac{D_1}{D_1 + D_2} = 1 - 5/10 = 0.5 \text{ of total voltage}$$

and

Voltage(pair 2) =

$$1 - \frac{D_2}{D_1 + D_2} = 1 - 5/10 = 0.5 \text{ of total voltage}$$

As another example, if the center of the beam is 2 um to the right of the center of pair 1 and 8 um to the left of the center of pair 2, then Voltage(pair 1) =

$$1 - \frac{D_1}{D_1 + D_2} = 1 - 2/10 = 0.8 \text{ of total voltage}$$

and

Voltage(pair 2) =

$$1 - \frac{D_2}{D_1 + D_2} = 1 - 8/10 = 0.2 \text{ of total voltage.}$$

Figure 10A:
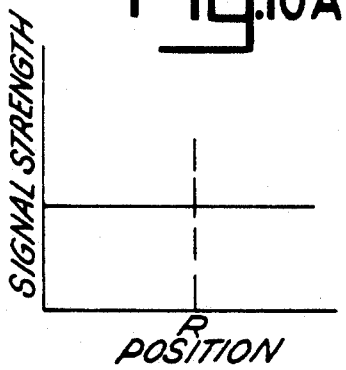
FIG. 10a is a graph of the signal strength of the photodetectors of FIG. 2 as a function of position when the beam is focused on the data track.
Figure 10B:
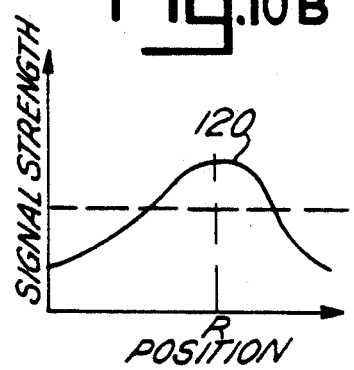
FIG. 10b is a graph of signal strength of the photodectors of FIG. 2 as a function of position when the beam is focused too close to the data track.
Figure 10C:
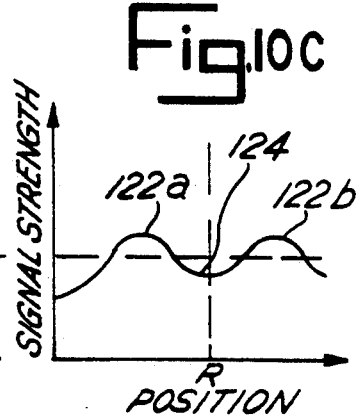
FIG. 10c is a graph of signal strength of the photodectors of FIG. 2 as a function of position when the beam is focused too far from the data track.

The output signal from the photodetectors 50 (FIG. 2) is used to adjust the voltage supplied to the electrode pairs of electro-optic focus 38. FIG. 10a is a graph of signal strength as a function of position in the radial direction in the vicinity of the beam center when the electro-optic focus is correctly focusing the beam upon the surface of the data track. The signal strength is constant in the radial direction across the photodetectors. If the focus is too far, the return signal will exhibit a peak in the middle, as shown in FIG. 10b. The height of the peak is proportional to the amount the beam is out of focus. The voltage supplied to the electrodes of the electro-optic focus must be increased to shorten the focus and flatten out the signal strength. Referring to FIG. 10c, if the focus is too close, the return signal will exhibit twin peaks 122A and 122B on either side of the beam center 124. The height of the peaks 122A and 122B is proportional to the amount the beam is out of focus. By lowering the voltage supplied to the electrodes, the focus is adjusted to flatten out the signal strength across the photodetectors.

Figure 11A:
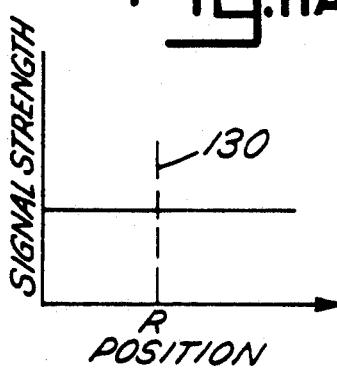
FIG. 11a is a graph of signal strength of the photodectors of FIG. 2 as a function of position when the beam is radially aligned with the data track.
Figure 11B:
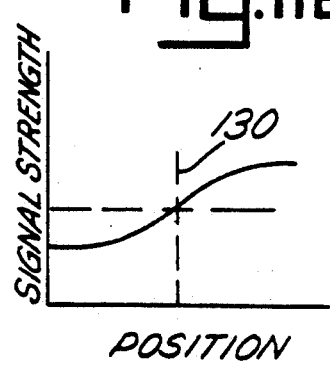
FIG. 11b is a graph of signal strength of the photodectors of FIG. 2 as a function of position when the beam is offset from the data track in a radially inward direction.
Figure 11C:
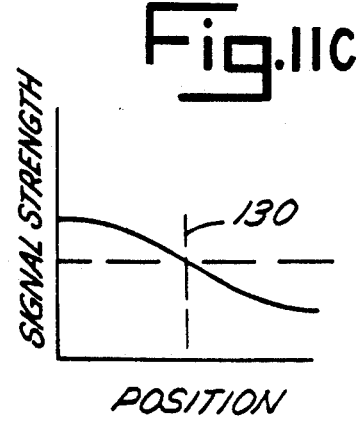
FIG. 11c is a graph of signal strength of the photodectors of FIG. 2 as a function of position when the beam is offset from the data track in a radially outward direction.

The signals from the photodetectors 50 (FIG. 2) are also used to adjust the tracking of the beam. In the case that the optical disk 22 (FIG. 2) is of the type that does not reflect light in the region between the data tracks, the tracking can be determined by comparing the return signal radially inward from the beam center to the return signal radially outward from the beam center. Referring to FIG. 11a, when the return signal is equal on either side of the beam center 130, the beam is radially aligned with the data track and the integrated coarse adjustment 34 (FIG. 1) is tracking properly. In FIG. 11b, the radially-out signal is stronger than the radially-in signal, indicating that the beam is tracking radially inward. In FIG. 11c, the radially-in signal is stronger than the radially-out signal, indicating that the beam is tracking too far radially outward. It has been determined that a small amount of asymmetry will not materially affect the performance of the optical disk reader. However, if the asymmetry reaches a predetermined threshold value, an adjacent set of electrodes in the integrated coarse adjustment can be energized and the voltage removed from the presently energized set, thus shifting the beam radially inward or outward as is necessary. The logic design of the control circuit 52 to cause different sets of electrodes to be energized can be developed by well-known methods know to those of ordinary skill in the art. Similarly, the logic design to enable the control circuit to supply voltages to pairs of electrodes in the electro-optic focus according to the teachings of the present invention is also conventional and according to well known methods.

While I have disclosed herein preferred and alternative forms in which the invention may be embodied, it will be evident to those of ordinary skill in the art that variations may be made in the details of the optical disk reader with out departing from the true spirit and scope of the invention. For example, passive waveguide devices may be substituted for electrodes in the integrated coarse adjustment when multiple stages are used. Further, by increasing the power of the laser beam, the optical disk reader of the present invention can be used as a device to write data to an optical disk. The spirit and scope of the appended claims is intended to cover all such alternative designs and uses of the invention.

What is claimed is:

1. A solid state optical disk reader for accessing data stored on an optical disk comprising:
   (a) a light source emitting a monochromatic beam in a beam direction;
   (b) a waveguide optically coupled to said light source and confining said beam to a defined region;
   (c) electro-optic adjustment and focus means including:
      (i) an integrated electro-optic coarse adjustment means which electrically deflects said beam in said waveguide at the approximate radial distance of the desired data track, and
      (ii) a separate electro-optic focus means which focuses said course adjusted beam upon the surface of said data track;
   (d) reflecting means coupled to said waveguide for reflecting said beam from said waveguide to said data track;
   (e) detector means for detecting said beam after reflection of said beam from said data track, said detector means responsively issuing a signal; and
   (f) a control circuit receiving said signal from said detector and responsively issuing control signals to said electro-optic adjustment and focus means.

2. The optical disk reader as claimed in claim 1 wherein said integrated coarse adjustment comprises a plurality of parallel surface mounted electrodes which locally alter the refractive index of said waveguide when a voltage is supplied thereto so as to deflect said beam at the approximate radial distance of said data track.

3. The optical disk reader as claimed in claim 2 wherein said plurality of parallel surface mounted electrodes are oriented at a 45° angle with respect to said beam direction.

4. The optical disk reader as claimed in claim 2, wherein said plurality of parallel surface mounted electrodes are arranged into an integer number of stages of electrodes, each stage deflecting said beam by a fraction of the desired total diffraction angle.

5. The optical disk reader as claimed in claim 4 wherein said number of stages is between 2 and 10, inclusive.

6. The optical disk reader as claimed in one of claims 2-5 wherein said plurality of parallel surface mounted electrodes are arranged in sets, the depth of each set being at least equal to the quantity $$\frac{\lambda N \cos \theta_\beta}{2 \Delta N}$$

where
   $\lambda$ is the wavelength of the beam;
   $\Delta N$ is the change in refractive index of the waveguide caused when a voltage is applied to said electrodes;
   $N$ is the refractive index of the waveguide when the waveguide is in a relaxed state; and
   $\theta_\beta$ is the angle between said electrodes and said beam.

7. The optical disk reader as claimed in one of claims 2-5 wherein the spacing between adjacent parallel electrodes in said integrated coarse adjustment is approximately $$\frac{\lambda}{2 \sin \theta_\beta}$$

where
   $\lambda$ is the wavelength of the beam; and
   $\theta_\beta$ is the angle between the said electrodes and said beam direction.

8. The optical disk reader as claimed in claim 1 wherein said separate integrated electro-optic focus means comprises a plurality of parallel surface mounted electrodes arranged in an array and parallel to the direction of beam propagation after deflection by said integrated coarse adjustment means, wherein a voltage is applied to pairs of said electrodes thereby changing the refractive index of said waveguide so as to focus said beam onto said data track.

9. The optical disk reader as claimed in claim 8 wherein said electrodes are spaced less than 30 micrometers apart.

10. The optical disk reader as claimed in claim 1 wherein said waveguide includes a graded index region through which said beam passes before entering said reflecting means, said graded index region reducing scattering of said beam before exit of said beam from said waveguide.

11. The optical disk reader as claimed in claim 1 wherein said reflecting means comprises:
   a polarized prism cube optically coupled to said waveguide having a prism plate for reflecting said beam to said disk; and
   a quarter wave plate between said prism cube and said disk, whereby said beam, upon transmission through said quarter wave plate to said disk and reflection off said disk through said quarter wave plate, passes through said prism cube and impinges upon said detector means.

12. The optical disk reader as claimed in claim 11 wherein said polarized prism cube is butt-coupled to said waveguide.

13. The optical disk reader as claimed in claim 1 wherein said detector means produces a feedback signal, said control circuit in response to said feedback signal electrically adjusting the direction and focus of said beam in response to said feedback signal so as to continuously focus said beam upon said data track at the radial distance of said data track.

14. The optical disk reader as claimed in claim 1 wherein said optical disk reader further comprises a collimator incorporated into said waveguide, said beam passing through said collimator before reaching said electro-optic adjustment and focus means.

15. The optical disk reader as claimed in claim 1 wherein said light source is a GaAlAs laser.

16. The optical disk reader as claimed in claim 1 wherein said waveguide is composed of Ti diffused in $LiNbO_3$.

17. A method for accessing data stored on an optical disk comprising the steps of:
   (a) emitting from a laser source a beam in a beam direction, said beam confined in waveguide optically coupled to said laser source,
   (b) adjusting said beam direction through said waveguide by electrically changing the index of refraction of said waveguide, so as to align said beam radially with a data track on said optical disk;
   (c) separately focusing said beam upon said data track by electrically changing the index of refraction of said waveguide so as to emulate a lens;
   (d) reflecting said beam from said waveguide to said disk,
   (e) detecting said beam after reflection of said beam from said disk and responsively issuing a signal; and
   (f) controlling the beam direction and focus in response to said signal.

18. The method of claim 17 wherein the step of adjustment comprises the step of bending said beam in a series of discrete steps by application of a voltage to surface mounted electrodes oriented at an angle with respect to said beam direction as said beam direction changes to coincide radially with said data track.

19. A solid state optical disk reader for accessing data stored on an optical disk, comprising:
   (a) a light source emitting a beam in a beam direction;
   (b) a waveguide optically coupled to said light source and confining said beam to a defined region;
   (c) an integrated course adjustment comprising a plurality of parallel surface mounted electrodes which change the refractive index of said waveguide when a voltage is supplied thereto so as to bend said beam to the approximate radial distance of said data track, said electrodes arranged in sets and oriented at an angle with respect to said beam direction;
   (d) a separate electro-optic focus means comprising a plurality of surface mounted electrodes arranged in an array, whereby a voltage is applied to pairs of said electrodes thereby changing the refractive index of said waveguide so as to focus said beam onto said data track;
   (e) a polarized prism optically coupled to said waveguide having a prism plate for reflecting said beam to said disk;
   (f) a detector for detecting said beam after reflection from said disk, said detector producing a feedback signal; and
   (g) a control circuit receiving said feedback signal and responsively controlling said voltages applied to said coarse adjustment and focus, whereby said beam is continuously focused upon said disk at the approximate radial distance of said data track.

* * * * *